US008857655B2

(12) United States Patent
Kneer

(10) Patent No.: US 8,857,655 B2
(45) Date of Patent: Oct. 14, 2014

(54) CONTAINER HAVING AN INNER BAG

(75) Inventor: Roland Kneer, Farchant (DE)

(73) Assignee: Gaplast GmbH, Altenau (DE)

( * ) Notice: Subject to any disclaimer, the term of this patent is extended or adjusted under 35 U.S.C. 154(b) by 0 days.

(21) Appl. No.: 13/806,374

(22) PCT Filed: Jun. 7, 2011

(86) PCT No.: PCT/DE2011/001387
§ 371 (c)(1),
(2), (4) Date: Jan. 11, 2013

(87) PCT Pub. No.: WO2012/000491
PCT Pub. Date: Jan. 5, 2012

(65) Prior Publication Data
US 2013/0161341 A1 Jun. 27, 2013

(30) Foreign Application Priority Data
Jun. 24, 2010 (DE) .......................... 10 2010 024 980

(51) Int. Cl.
*B65D 1/32* (2006.01)
(Continued)

(52) U.S. Cl.
CPC ................ *B65D 1/0215* (2013.01); *B65D 1/32* (2013.01); *B65D 83/0055* (2013.01); *B29L 2009/001* (2013.01); *B29C 49/04* (2013.01); *B29C 49/22* (2013.01); *B29C 47/065* (2013.01); *B65D 37/00* (2013.01); *B29C 47/0023* (2013.01); *Y10S 215/902* (2013.01)
USPC ........ 220/723; 220/62.21; 215/11.3; 215/902

(58) Field of Classification Search
CPC ........... B65D 83/0055; B65D 83/0061; B65D 90/02; B65D 90/046; B65D 90/04
USPC .............. 215/378, 385, 902, 11.3; 220/62.21, 220/723, 720
See application file for complete search history.

(56) References Cited

U.S. PATENT DOCUMENTS 1,589,138 A * 6/1926 Fisk .............................. 215/11.6
2,999,500 A * 9/1961 Schurer ......................... 604/322
(Continued)

FOREIGN PATENT DOCUMENTS

EP 0182094 A2 5/1986
EP 0550772 9/1998
(Continued)

OTHER PUBLICATIONS

International Search Report prepared by the EPO, dated Jan. 24, 2012.
(Continued)

Primary Examiner — Steven A. Reynolds
Assistant Examiner — Javier A Pagan
(74) Attorney, Agent, or Firm — Greer, Burns & Crain, Ltd.

(57) ABSTRACT

The container produced in a coextrusion-type blow molding process, which consists of a substantially rigid outer container and an easily deformable inner bag, with the inner bag being closed by a bottom weld seam when excess material is squeezed off at the bottom of a blow mold, and said bottom weld seam being clamped in a likewise closed bottom weld seam of the outer container, at least one pressure compensating opening being formed on both sides of the bottom weld seam, and all pressure compensating openings being formed at points of the outer container that are offset in the circumferential direction from the intersection lines of a plane extending through the bottom weld seam and through the longitudinal center axis of the container with the circumferential wall of the outer container and of the inner bag so that the inner bag contracts only from two sides when the container contents is dispensed, is characterized in that the wall thickness of the inner bag is greater in the area of the intersection lines than in the interposed circumferential portions.

3 Claims, 2 Drawing Sheets

(51) Int. Cl.
  *B65D 6/12* (2006.01)
  *B65D 3/22* (2006.01)
  *A61J 9/00* (2006.01)
  *B65D 83/00* (2006.01)
  *B29C 49/04* (2006.01)
  *B29C 49/22* (2006.01)
  *B65D 1/02* (2006.01)
  *B65D 37/00* (2006.01)
  *B29C 47/00* (2006.01)
  *B29L 9/00* (2006.01)
  *B29C 47/06* (2006.01)

(56) References Cited

U.S. PATENT DOCUMENTS

| | | | | |
|---|---|---|---|---|
| 3,834,570 | A | * | 9/1974 | Barr ............................. 215/11.3 |
| 6,109,468 | A | * | 8/2000 | Kneer ............................ 215/378 |
| 6,691,494 | B2 | * | 2/2004 | Nomoto et al. ................. 53/410 |

FOREIGN PATENT DOCUMENTS

| | | |
|---|---|---|
| EP | 1449779 | 8/2010 |
| FR | 2922145 | 4/2009 |
| JP | 387654 | 9/1991 |
| JP | 4267727 | 9/1992 |
| JP | 6239332 | 8/1994 |
| JP | 8026241 | 1/1996 |
| JP | 880929 | 3/1996 |
| JP | 3935213 | 3/2007 |
| WO | 9801366 | 1/1998 |

OTHER PUBLICATIONS

Kosaku Tamura, Notification of Reasons for Refusal, Japanese Patent Application 10-504647, Mar. 28, 2006.

Kosaku Tamura, Notification of Reasons for Refusal, Japanese Patent Application 10-504647, Oct. 3, 2006.

* cited by examiner

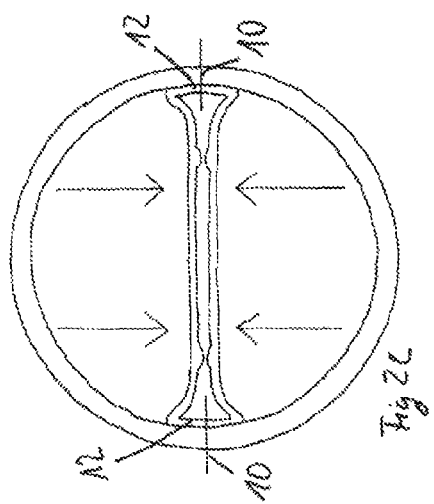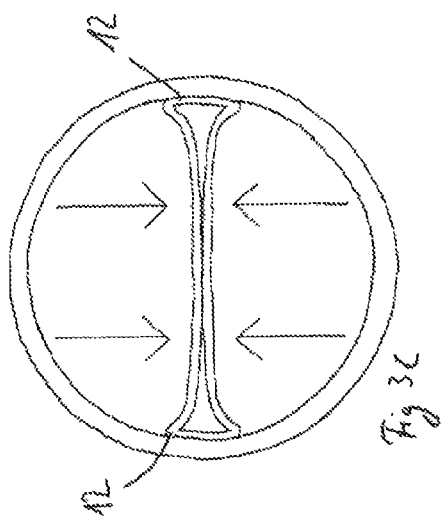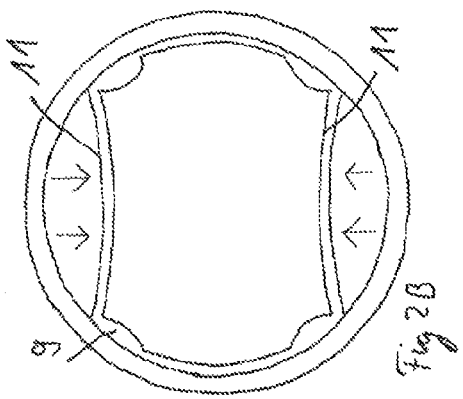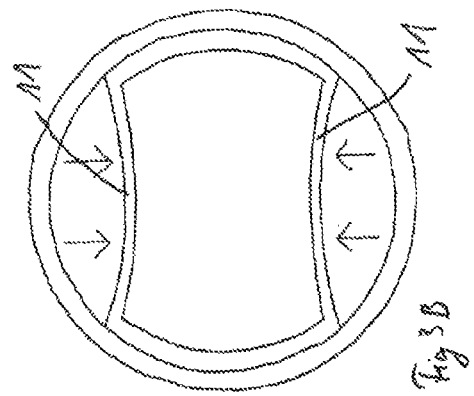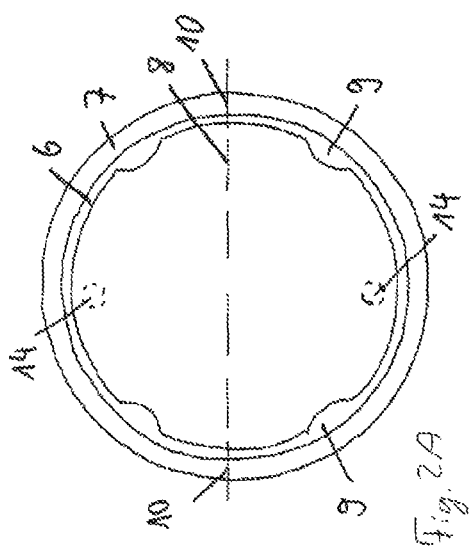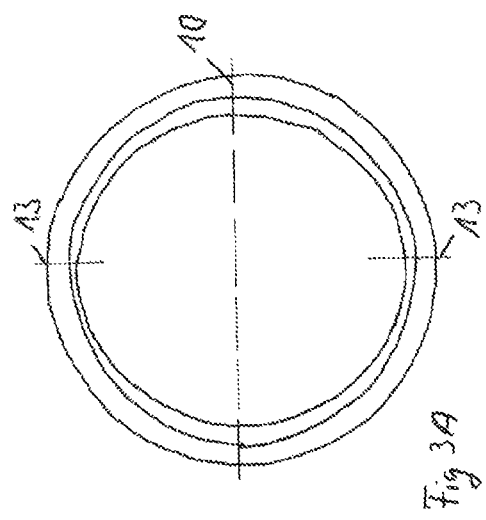

CONTAINER HAVING AN INNER BAG

CROSS REFERENCE

This application is a U.S. National Phase under 35 U.S.C. §371 of International Application No. PCT/DE2011/001387, filed Jun. 7, 2011, which claims priority from German Patent Application No. 10 2010 024 980.7, filed Jun. 24, 2010.

FIELD OF THE INVENTION

The present invention refers to a container produced in a coextrusion-type blow molding process, which consists of a substantially rigid outer container and an easily deformable inner bag which are made from respectively different thermoplastic materials that do not form a welded joint with one another, comprising a container opening and at least two pressure compensating openings in the wall of the outer container for pressure compensation within the space existing between the outer container and the inner bag upon contraction of the inner bag, with the inner bag being closed by a bottom weld seam when excess material is squeezed off at the bottom of a blow mold, and said bottom weld seam being clamped in a likewise closed bottom weld seam of the outer container, at least one pressure compensating opening being formed on both sides of the bottom weld seam, and all pressure compensating openings being formed at points of the outer container that are offset in the circumferential direction from the intersection lines of a plane extending through the bottom weld seam and through the longitudinal center axis of the container with the circumferential wall of the outer container and of the inner bag so that the inner bag contracts only from two sides when the container contents is dispensed.

The pressure compensating openings are here preferably formed in the bottom or in the shoulder portion of the outer container, but they may in principle also be located in the circumferential wall of the outer container.

BACKGROUND OF THE INVENTION

A container of the aforementioned type is known from EP 0 912 420 B1. When container contents is dispensed e.g. with the help of a pump, the volume of the inner bag is decreasing, and air enters from the surroundings of the container into the space between inner bag and outer container for the purpose of pressure compensation. The inner bag lifts off on two opposite portions from the wall of the outer container, the center thereof being offset by about 90° from the intersection lines of a plane extending through the bottom weld seam and the longitudinal center axis of the container with the circumferential wall of the outer container, i.e. the inner bag is compressed at both sides to become increasingly flatter and in an ideal case it assumes a so-called "dog bone form" upon its contraction. It has however been found that the two opposite portions may detach from the outer container in an uneven manner, said detachment process always starting at one side and the other side detaching at a later time. When the two sides have detached from the outer container to different degrees and are thereby pressed together into a flat shape, a considerable residual amount of the container contents that cannot be discharged may remain in the inner bag.

SUMMARY OF THE INVENTION

It is the object of the present invention to develop a container of the type in question to such a degree that the residual amount of the container contents that remains in the inner bag in the end and cannot be discharged is reduced.

This object is achieved according to the invention by a container produced in a coextrusion-type blow molding process, which consists of a substantially rigid outer container and an easily deformable inner bag which are made from respectively different thermoplastic materials that do not form a welded joint with one another. The container comprises a container opening and at least two pressure compensating openings in the wall of the outer container for pressure compensation within the space existing between the outer container and the inner bag upon contraction of the inner bag. The inner bag is closed by a bottom weld seam when excess material is squeezed off at the bottom of a blow mold. The bottom weld seam is clamped in a likewise closed bottom weld seam of the outer container. At least one pressure compensating opening is formed on both sides of the bottom weld seam, and all pressure compensating openings are formed at points of the outer container that are offset in the circumferential direction from the intersection lines of a plane extending through the bottom weld seam and through the longitudinal center axis of the container with the circumferential wall of the outer container and of the inner bag so that the inner bag contracts only from two sides when the container contents is dispensed. The container is characterized in that the wall thickness of the inner bag is greater in the area of the intersection lines than in the interposed circumferential portions. In another embodiment, the container is characterized in that the wall of the inner bag comprises rib-like thickened portions at least at four points of its circumference, the rib-like thickened portions being positioned in pairs in symmetry with the plane.

Further advantageous developments of the invention are described below.

According to a first principle of the invention the wall thickness of the inner bag in the area of the intersection lines is greater than in the interposed circumferential portions. This wall thickness profile extends preferably over the whole height of the inner bag. It may advantageously be provided here that the wall thickness at both sides of the intersection lines is substantially constant over a predetermined circumferential section, which has the same length at both sides, so as to subsequently decrease in a continuous or abrupt way. This configuration has the consequence that the inner bag will selectively detach from the outer container upon its contraction in that the circumferential section of reduced thickness first of all lifts off at a side of the bag, whereupon the opposite circumferential section of reduced thickness will follow suit before the detachment process is continued in the portions of undiminished thickness. This selective folding process has the consequence that the inner bag will detach on both sides to substantially the same extent until the opposite wall sections come to rest on each other in the area of the above-defined plane. This has the consequence that only an extremely small residual amount that cannot be discharged will remain in the inner bag.

The inner bag is here folded together virtually in two steps, the geometry of the detaching process being substantially definable by the wall thickness of the inner bag. The inner bag will adhere to the outer container through suitable selection of the wall thickness in the area of the intersection lines for such a long time until the interposed circumferential sections on both sides have completely detached from the outer container, with the subsequent second detachment process then taking place also substantially in symmetry with the central plane. Moreover, this configuration has the consequence that the negative pressure in the inner bag is small so that the risk of leakage and permeation in the inner bag is reduced.

The transition from the wall thickness in the area of the intersection lines to the thinned portions can be almost abrupt, i.e., the wall thickness is reduced over a very short length; the subsequent circumferential section may here have a reduced constant thickness. The wall of the inner bag, however, may also be continuously decreasing to a minimum value that is offset by about 90° from the plane of the bottom weld seam.

It is however also within the scope of the invention that the wall thickness of the inner bag is continuously decreasing, starting from the intersection lines. This will also accomplish a substantially symmetrical folding of the inner bag.

Under an alternative aspect of the present invention the wall of the inner bag comprises rib-like thickened portions at least at four points of its circumference, said rib-like thickened portions being positioned in pairs in symmetry with the plane of the bottom weld seam. All of the thickened portions have the same distance from the associated intersection lines.

Apart from the rib-like thickened portions, the wall thickness of the inner bag may be constant in circumferential direction, or in the area of the intersection lines up to the associated two thickened portions it may be greater than in the two other areas on which the detachment process starts from the outer container. The thickened portions may here have an inner contour in the form of a circular arc.

In appropriately selecting the dimensions, which depend above all on the container size, on the container shape and on the materials used, it is possible that the detachment process takes place in a first step only up to the respective rib-like thickened portions of the two sides. When the container contents is further dispensed, the rib-like thickened portions and the subsequent circumferential sections will also lift from the wall of the outer container, so that the inner bag folds flat in the center of the outer container in the area of the plane of the bottom weld seam. In this instance, too, only an extremely small residual amount of the container liquid that cannot be discharged will remain in the inner bag.

As has been stated above, the selection of the thickness of the individual portions of the inner bag depends on many factors, inter alia on the size and the shape of the container and on the materials used. As a material for the outer container, PET and PCTG are e.g. suited for transparent containers and polyolefins or other thermoplastic materials for opaque containers while the inner bag may be single-layered or multi-layered and may e.g. consist of SURLYN, EVOH, SURLYN as a three-layered inner bag. Viewed in cross section, the container may have a circular round shape, but also an oval or rectangular form; here, a symmetrical detachment process in the case of the circular cylindrical form has so far posed the greatest problems.

In the above-mentioned first variant, the inner bag may e.g. have a thickness of 0.15 mm to 0.25 mm and may consist—also only by way of example—of three material layers, each having a thickness of 0.05 mm, with interposed adhesive layers (also 0.05 mm). If this is the thickness in the area of the central plane extending through the bottom weld seam, the wall thickness at the thinnest point may e.g. be 0.05 mm to 0.08 mm thinner.

When in the second variant the wall thickness of the inner bag is for example constantly 0.15 mm over the circumference, it may be 0.2 mm to 0.25 mm on the ribs.

It has been found that the configuration of the ribs has no disadvantageous impact on the configuration of the bottom weld seam, so that the inner bag is here tightly closable.

The pressure compensating openings are advantageously offset by 90° from the intersection lines. The invention is however not limited to this, but there may e.g. also be provided two, circumferentially spaced-apart pressure-compensating openings at each side that may be offset in pairs by about 80° each from the intersection lines. Plural pressure compensating openings may also be formed spaced apart in superposed fashion at each side of the bottom weld seam.

The container according to the invention may also be a so-called wide-neck container because the pressure compensating openings may be formed at any desired place of the outer container.

BRIEF DESCRIPTION OF THE DRAWINGS

Further details of the invention become apparent from the following description of two embodiments of the invention. Schematically shown is in FIG. 1 a vertical section through a container with an inner bag;

FIGS. 2A to 2C an embodiment with an inner bag having rib-like thickened portions; and FIGS. 3A to 3C an embodiment with stiffening portions on the intersection lines.

DETAILED DESCRIPTION

Figure 1:
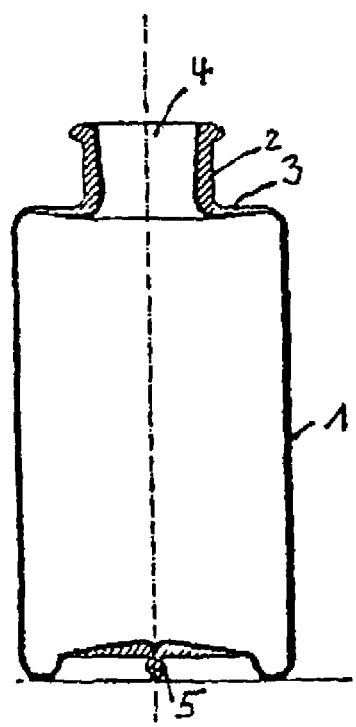

The container 1 shown in FIG. 1 includes a container neck 2 and a shoulder section 3. The container opening 4 may have attached thereto a pump for discharging the container contents, without the invention being limited thereto. The container can also be designed as a squeeze bottle in the case of which the container wall is squeezed by hand for discharging the container contents, and the container may also be a so-called wide-neck container without any shoulder section.

At the bottom of the container, preferably due to the fact that the blow mold has been closed, there is formed a projecting web which, when viewed in cross-section, is approximately shaped as a kite and has a portion, in the figure a lower portion, in which the material layers of the outer container contact each other because in the mold cavity of the web the two squeezed-off material layers of the inner bag have slightly receded upwards from the separation point. The weld seam of the inner bag which has been formed during the squeeze-off operation is clamped in the upper portion of the web 5 and thus held in axial direction.

FIG. 2A shows the initial state of a first embodiment in which the inner bag 6 is positioned with its whole circumference on the inside of the outer container 7. Reference numeral 8 designates the plane that extends through the bottom weld seam and through the central longitudinal axis of the container. The inner bag 6 has a constant wall thickness, except for four rib-like thickened portions 9, the inner contour of which is in the form of a circular arc when viewed in cross section and which have the same circumferential distance from the intersection lines 10 between the plane 8 and the outer container 7 (and the inner bag 6). Reference numeral 14 outlines two pressure compensating openings.

Upon discharge of container contents the inner bag 6 first detaches at both sides (mostly in time-consecutive order) in the areas designated by 11 from the wall of the outer container 7, namely up to the rib-like thickened portions 9. This is achieved by selecting the wall thickness of the inner bag 6 in an appropriate way.

The further discharging of container contents will yield the configuration shown in FIG. 2C, in which the inner bag 1 remains in abutment with the outer container 7 only in a small portion 12 around the intersection lines 10. The detachment process of the inner bag takes place substantially in symmetry with the central plane.

In the embodiment shown in FIGS. 3A to 3C, the wall thickness of the inner bag 6 is continuously decreasing from the area of the intersection lines 10 up to the intersection lines 13 which are offset by 90°. An appropriate selection of the wall thickness profile in circumferential direction has again the consequence that the two opposite circumferential portions 11 first detach from the wall of the outer container, whereupon the detachment process continues up to the state shown in FIG. 3C, in which only small opposite circumferential portions 12 adhere again to the wall of the outer container 7.

Prior to the filling of the inner bag, the bag is detached in part from the outer container 7 by applying a negative pressure and is then placed again on the wall of the outer container by applying an overpressure. This preceding detachment process takes place in a corresponding way.

It should be noted that the invention is not limited to the described and illustrated embodiments. Rather, all of the disclosed features of the three embodiments can also be combined individually with one another in a way differing from the above-described one.

The invention claimed is:

1. A container produced in a coextrusion-type blow molding process, which comprises a substantially rigid outer container and an easily deformable inner bag which are made from respectively different thermoplastic materials that do not form a welded joint with one another, comprising a container opening and at least two pressure compensating openings in a wall of the outer container for pressure compensation within a space between the outer container and the inner bag upon contraction of the inner bag, with the inner bag being closed by a bottom weld seam when excess material is squeezed off at a bottom of a blow mold, and said bottom weld seam being clamped in a likewise closed bottom weld seam of the outer container, at least one pressure compensating opening being formed on each side of the bottom weld seam, and all pressure compensating openings being formed at points of the outer container that are offset in the circumferential direction from an intersection line of a plane extending through the bottom weld seam and through a longitudinal center axis of the container with a circumferential wall of the outer container and of the inner bag so that the inner bag contracts only from two sides when the container contents is dispensed, wherein the wall of the inner bag comprises ribs on an interior side of the inner bag at least at four points of its circumference, said ribs being positioned in pairs on each side of the intersection line in symmetry with the plane; wherein the bag has a thinner wall thickness between the pair ribs on each side of the intersection line than the wall thickness of the bag at the intersection line.

2. The container according to claim 1, wherein all ribs have the same distance from the plane.

3. The container according to claim 1, wherein the outer container consists of a transparent material.

\* \* \* \* \*